(12) United States Patent
Seo et al.

(10) Patent No.: US 8,570,947 B2
(45) Date of Patent: Oct. 29, 2013

(54) SCHEDULING METHOD IN WIRELESS COMMUNICATION SYSTEM USING RELAY STATION

(75) Inventors: Han Byul Seo, Gyeongki-do (KR); Byoung Hoon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 13/119,579

(22) PCT Filed: Aug. 13, 2009

(86) PCT No.: PCT/KR2009/004521
§ 371 (c)(1),
(2), (4) Date: Mar. 17, 2011

(87) PCT Pub. No.: WO2010/047466
PCT Pub. Date: Apr. 29, 2010

(65) Prior Publication Data
US 2011/0170513 A1    Jul. 14, 2011

Related U.S. Application Data

(60) Provisional application No. 61/107,323, filed on Oct. 21, 2008.

(30) Foreign Application Priority Data

Dec. 5, 2008  (KR) ......................... 10-2008-0122845

(51) Int. Cl.
*H04Q 7/00*  (2006.01)

(52) U.S. Cl.
USPC .......................................... 370/328; 370/329

(58) Field of Classification Search
USPC ...................... 370/328, 329; 455/7
See application file for complete search history.

(56) References Cited

U.S. PATENT DOCUMENTS

| | | | |
|---|---|---|---|
| 2007/0110016 A1 | 5/2007 | Shen et al. | |
| 2007/0201400 A1* | 8/2007 | Kang et al. | 370/329 |
| 2008/0070582 A1 | 3/2008 | Cai | |
| 2008/0205323 A1 | 8/2008 | Kaneko et al. | |
| 2009/0075587 A1* | 3/2009 | Yu et al. | 455/7 |
| 2009/0135778 A1* | 5/2009 | Lee et al. | 370/329 |
| 2009/0147731 A1* | 6/2009 | Chion et al. | 370/328 |
| 2011/0153352 A1* | 6/2011 | Semian | 705/2 |

FOREIGN PATENT DOCUMENTS

| | | |
|---|---|---|
| EP | 1 786 144 A2 | 5/2007 |
| JP | 2007-184940 | 7/2007 |

* cited by examiner

*Primary Examiner* — Chuong T Ho
(74) *Attorney, Agent, or Firm* — Morgan, Lewis & Bockius LLP

(57) ABSTRACT

A scheduling method in a wireless communication system using a relay station is provided. The method includes receiving scheduling information from the relay station, and performing scheduling by using the scheduling information, wherein a scheduling metric is determined for each mobile station or each connection when the scheduling is performed. Accordingly, scheduling can be effectively performed since a base station can recognize a state of a relay station.

11 Claims, 5 Drawing Sheets

SCHEDULING METHOD IN WIRELESS COMMUNICATION SYSTEM USING RELAY STATION

The present application is a national stage of PCT International Application No. PCT/KR2009/004521, filed Aug. 13, 2009, and claims the benefit of U.S. Provisional Application No. 61/107,323, filed Oct. 21, 2008. The present national stage application also claims the benefit of Korean Patent Application No. 10-2008-0122845, filed Dec. 5, 2008.

TECHNICAL FIELD

The present invention relates to wireless communications, and more particularly, to a method of scheduling radio resources in a wireless communication system using a relay station (RS).

BACKGROUND ART

Wireless communication systems are widely used to provide various types of communication services such as voice and data. The wireless communication systems are multiple access systems capable of sharing available radio resources and supporting communication with multiple users. For example, the radio resources are time, frequency, codes, transmission power, etc. Examples of multiple access systems include a TDMA (Time Division Multiple Access) system, a CDMA (Code Division Multiple Access) system, an FDMA (Frequency Division Multiple Access) system, an OFDMA (Orthogonal Frequency Division Multiple Access) system, an SC-FDMA (Single Carrier-Frequency Division Multiple Access) system, etc. The TDMA system uses time as radio resources, the FDMA system uses frequencies as radio resources, the CDMA system uses codes as radio resources, and the OFDMA system uses sub-carriers and time as radio resources. Furthermore, the wireless communication systems support bidirectional communication. Bidirectional communication can be performed using a TDD (Time Division Duplex) mode, an FDD (Frequency Division Duplex) mode, an H-FDD (Half-Frequency Division Duplex) mode, etc. According to the TDD mode, uplink transmission and downlink transmission are divided by time resources. According to the FDD mode, uplink transmission and downlink transmission are divided by frequency resources. According to the H-FDD mode, uplink transmission and downlink transmission are divided by combination of time resources and frequency resources.

A wireless communication system includes a base station that provides service to a cell which is a certain area. The quality of a signal transmission is affected by a variation of wireless environments in terms of characteristic of wireless transmission technology. Particularly, radio channels vary with time due to various types of scatters and movement of mobile stations. Furthermore, receive power abruptly decreases as a distance between wireless communication subjects increases, and thus the distance is restricted. Accordingly, a mobile station can communicate with a base station when the mobile station is located in the coverage of the base station, in general. As described above, a maximum transmission rate between a mobile station and a base station, throughput of a user in a cell and throughput of the entire cell decrease due to scatters, the moving speed of the mobile station, a distance between transmitting and receiving sides, etc. For example, if the mobile station is located on the boundary of the cell or an obstacle such as a building exists between the mobile station and the base station, the quality of communication between the mobile station and the base station may be poor.

To solve the aforementioned problem, various techniques for compensating for degradation of transmission signals between the base station and the mobile station are introduced to improve a maximum transmission rate and throughput and extend the coverage of the base station. One of the various techniques is introduction of a relay station in a wireless communication system. For instance, LTE (Long Term Evolution)-Advanced that is one of potent candidates of IMT (International Mobile Telecommunication)-Advanced corresponding to a next-generation mobile communication system following third-generation mobile communication systems includes a relay station. The institute of electrical and electronics engineers (IEEE) 802.16 standard which provides a technique and protocol for supporting broadband wireless access also considers the relay station. The relay station relays signals between a base station and a mobile station. The relay station can extend the coverage of the base station and improve cell throughput.

To allocate radio resources, a wireless communication system performs scheduling by considering a channel state, a buffer state, a quality of service (QoS) requirement, etc. FIG. 1 is a flow diagram showing a scheduling method for downlink data transmission between a BS and an MS. Herein, the MS may include at least one connection.

Referring to FIG. 1, the BS and the MS exchange a signal for connection configuration (step S100). A QoS requirement is included in the signal exchanged between the BS and the MS. For example, the QoS requirement may be a time delay requirement.

The MS reports a channel state of each connection to the BS (step S110). The MS may report the channel state to the BS periodically or aperiodically. Herein, the channel state may be indicated by a channel quality indicator (CQI), a signal to noise ratio (SNR), a signal to interference and noise ratio (SINR), etc.

The BS calculates a scheduling metric by considering the QoS requirement, the channel state, etc (step S120). The scheduling metric is obtained by quantifying feasibility of radio resource allocation for each MS or each connection. When the channel state between the BS and the connection is good, it implies that a large amount of data can be transmitted between the BS and the connection. Therefore, for a connection having a good channel state, the scheduling metric can be determined to be large. In addition, when the QoS requirement is high, for example, when a low time delay is required, the scheduling metric can be determined to be large.

The BS allocates a radio resource for downlink data transmission by referring to the scheduling metric (step S130). For example, the radio resource may be allocated to a connection for which the scheduling metric has a maximum value.

FIG. 2 is a flow diagram showing a scheduling method for uplink data transmission between a BS and an MS. Herein, the MS may include at least one connection.

Referring to FIG. 2, the BS and the MS exchange a signal for connection configuration (step S200). A QoS requirement may be included in the signal exchanged between the BS and the MS. The MS reports a buffer state of each connection to the BS (step S210). The BS calculates a scheduling metric by considering the QoS requirement, the buffer state, etc (step S220). For a connection for which a large amount of data is stored in a buffer, the scheduling metric can be determined to be large. The BS allocates a radio resource for uplink data transmission by referring to the scheduling metric (step S230). For example, the radio resource may be allocated to a connection for which the scheduling metric has a maximum value.

The aforementioned scheduling method is for data transmission between the BS and the MS in a situation where an RS does not exist. Therefore, a wireless communication system using the RS cannot use the scheduling method. Accordingly, there is a need for a method of effectively scheduling radio resources in the wireless communication system using the RS.

DISCLOSURE OF INVENTION

Technical Problem

The present invention provides a method of effectively scheduling radio resources in a wireless communication system using a relay station (RS).

The present invention also provides a method of transmitting downlink data in a wireless communication system using an RS.

Solution to Problem

According to an aspect of the present invention, a scheduling method in a wireless communication system using a relay station is provided. The method includes receiving scheduling information from the relay station, and performing scheduling by using the scheduling information, wherein a scheduling metric is determined for each mobile station or each connection when the scheduling is performed.

According to another aspect of the present invention, a scheduling information transmission method of a relay station in a wireless communication system is provided. The method includes configuring scheduling information for downlink transmission, and transmitting the scheduling information to a base station, wherein the scheduling information comprises a communication state between the relay station and a mobile station.

According to another aspect of the present invention, a downlink data transmission method in a wireless communication system using a relay station is provided. The method includes receiving scheduling information from the relay station, performing scheduling by using the scheduling information, and transmitting downlink data according to a result of the scheduling, wherein the downlink data is transmitted in a format of a multi-user packet for mobile stations connected to the same relay station.

Advantageous Effects of Invention

Scheduling can be effectively performed since a base station can recognize a state of a relay station.

MODE FOR THE INVENTION

Hereinafter, exemplary embodiments of the present invention will be described in detail with reference to the accompanying drawings.

Figure 1:
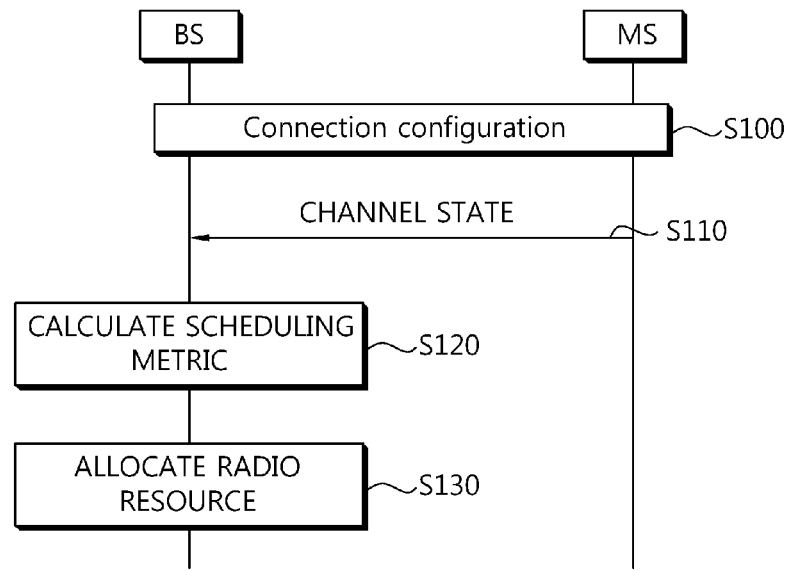
FIG. 1 is a flow diagram showing a scheduling method for downlink data transmission between a base station (BS) and a mobile station (MS).
Figure 2:
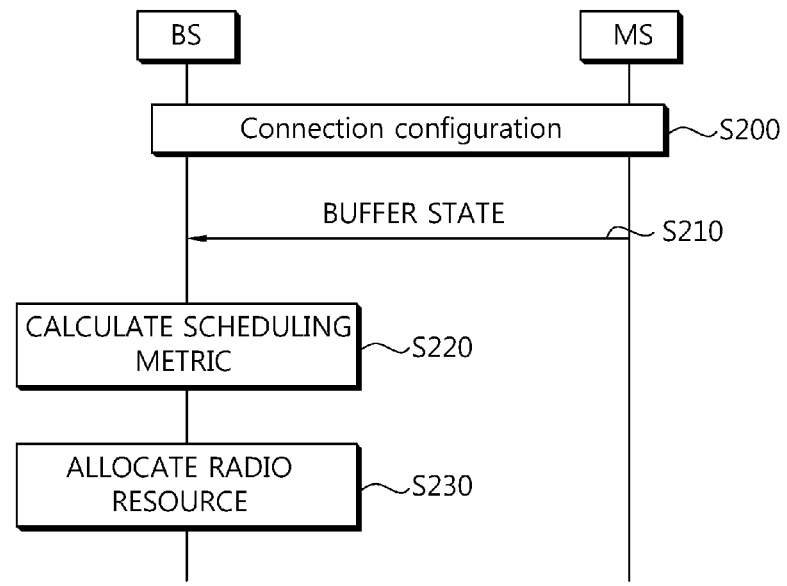
FIG. 2 is a flow diagram showing a scheduling method for uplink data transmission between a BS and an MS.
Figure 3:
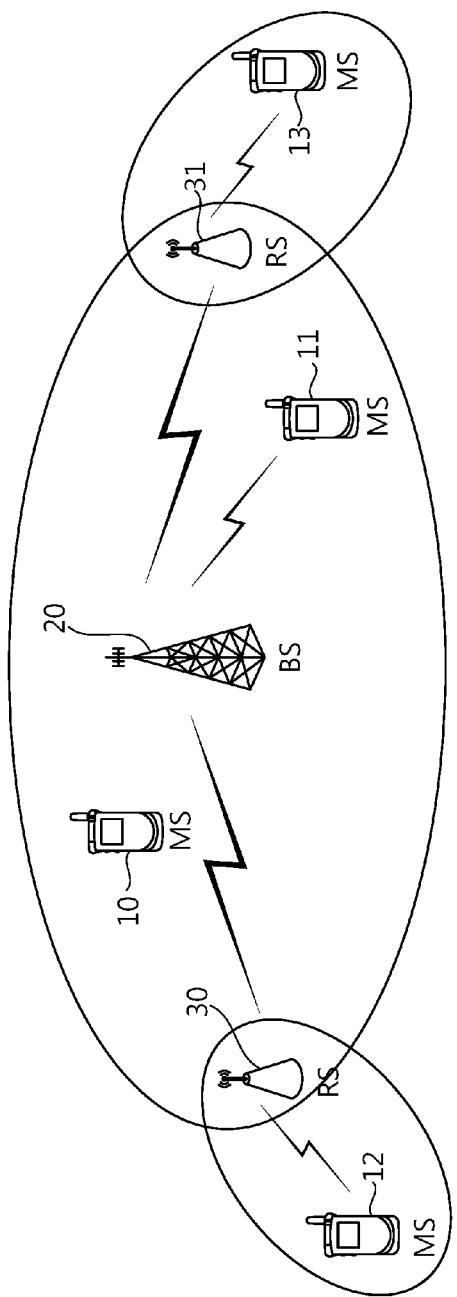
FIG. 3 is a diagram showing a wireless communication system using a relay station (RS).

FIG. 3 is a diagram showing a wireless communication system using a relay station. The wireless communication system can be widely deployed to provide a variety of communication services, such as voices, packet data, etc.

Referring to FIG. 3, the wireless communication system includes mobile stations (MSs) 10, 11, 12, and 13, a base station (BS) 20, and relay stations (RSs) 30 and 31. Each of the MSs 10, 11, 12, and 13 may be fixed or mobile, and may be referred to as another terminology, such as a user equipment (UE), a user terminal (UT), a subscriber station (SS), a wireless device, etc. The BS 20 is generally a fixed station that communicates with the MSs 10, 11, 12, and 13 and may be referred to as another terminology, such as a node-B (NB), a base transceiver system (BTS), an access point, etc. One BS 20 may include one or more cells. The RSs 30 and 31 are provided for coverage extension or data rate improvement resulted from a diversity effect, and are located between the MS and the BS. That is, the MSs 10 and 11 located inside the coverage of the BS 20 can directly communicate with the BS 20, and the MSs 12 and 13 located outside the coverage of the BS 20 communicate with the BS 20 via the RSs 30 and 31. Alternatively, for the data rate improvement resulted from the diversity effect, even the MSs 10 and 11 located inside the coverage of the BS 20 may communicate with the BS 20 via the RSs 30 and 31.

Hereinafter, a downlink (DL) denotes a communication link from the BS 20 to the MS 10, and an uplink (UL) denotes a communication link from the MS 10 to the BS 20. Thus, in the DL, communication can be achieved from the BS 20 to the MS 10 via the RS 30, and in the UL, communication can be achieved from the MS 10 to the BS 20 via the RS 30.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Figure 4:
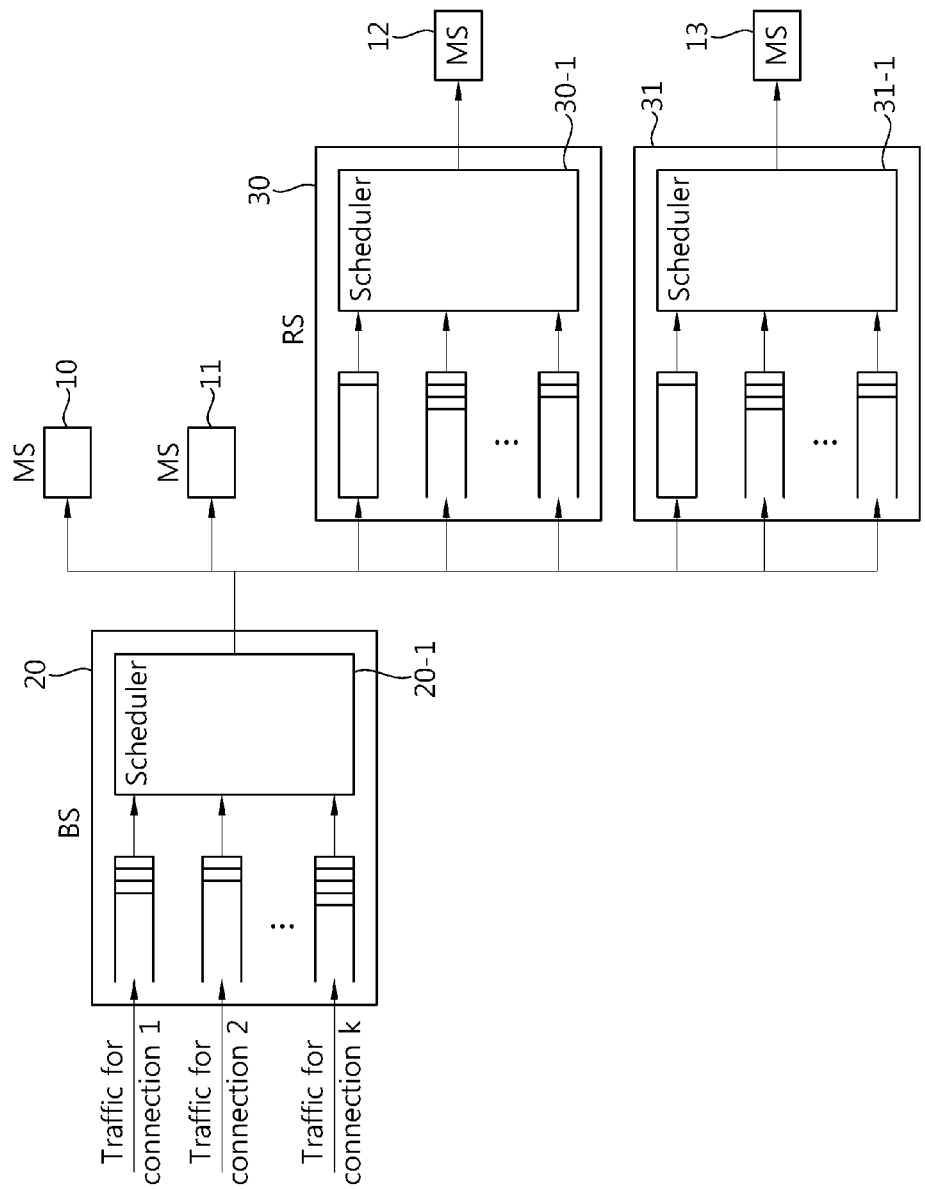
FIG. 4 is a block diagram for explaining a scheduling method of a wireless communication system using an RS.

FIG. 4 is a block diagram for explaining a scheduling method of a wireless communication system using an RS. In the following description, the same elements as those of the wireless communication system of FIG. 3 will be denoted by the same reference numerals.

Referring to FIG. 4, the wireless communication system includes MSs 10, 11, 12, and 13, an RSs 30 and 31, and a BS 20. Some MSs 10 and 11 are directly connected to the BS 20, and the remaining MSs 12 and 13 are connected to the BS 20 via the RSs 30 and 31. Although the BS 20 is connected to two RSs 30 and 31 as an example, the present invention is not limited thereto. Thus, one BS may be connected to one RS or a plurality of RSs. The BS 20 and the RSs 30 and 31 may include respective schedulers 20-1, 30-1 31-1. Each of the MSs 10, 11, 12, and 13 may include at least one connection. A plurality of connections included in the same MS may have different quality of services (QoSs).

A buffer of the BS 20 stores downlink data, and the BS 20 performs scheduling. The BS 20 allocates a radio resource based on a scheduling result, and transmits the downlink data by using the allocated radio resource. The downlink data for the MSs 12 and 13 connected to the BS 20 via the RSs 30 and 31 is transmitted from the BS 20 to the RSs 30 and 31, and is thereafter stored in a buffer of the RSs 30 and 31. The RSs 30 and 31 performs scheduling, and transmits the downlink data to the MSs 12 and 13.

Figure 5:
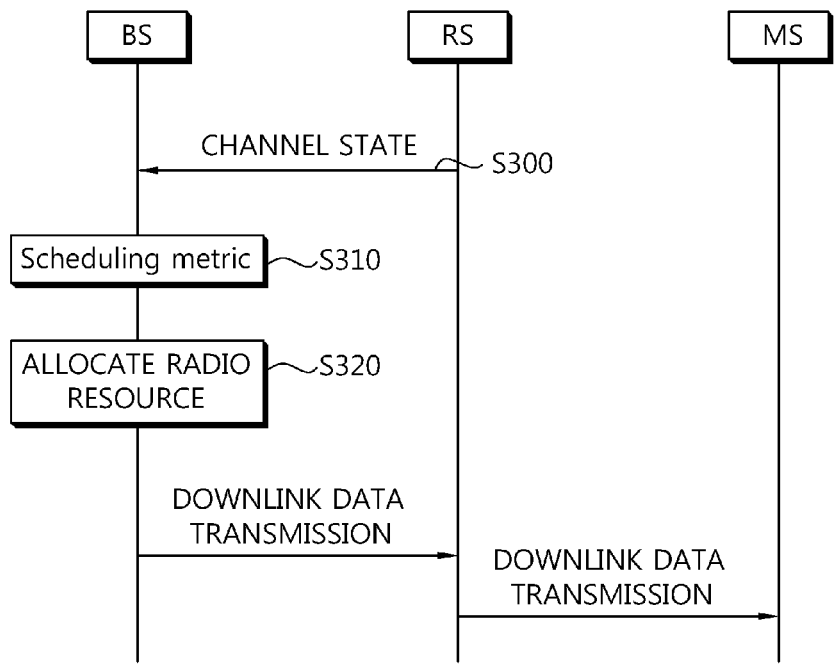
FIG. 5 is a flow diagram showing an example of a scheduling method for downlink data transmission in a wireless communication system using an RS.

FIG. 5 is a flow diagram showing an example of a scheduling method for downlink data transmission in a wireless communication system using an RS. In the wireless communication system using the RS, an MS may be connected to a BS via the RS or may be directly connected to the BS. Among all radio resources, the BS may allocate some radio resources as a radio resource for the MS connected to the BS via the RS and may schedule the some radio resources with respect to the RS. In addition, the BS may schedule all radio resources with respect to the MS connected to the BS via the RS or with respect to the MS directly connected to the BS.

Referring to FIG. 5, the RS reports a channel state of each connection (step S300). The channel state may be indicated by a channel quality indicator (CQI), a signal to noise ratio (SNR), a signal to interference and noise ratio (SINR), etc.

The BS calculates a scheduling metric by considering a communication state including the channel state received from the RS (step S310). The communication state may include not only the channel state but also a Qos requirement and a buffer state stored for each connection in the buffer of the BS.

The BS allocates a radio resource by referring to the scheduling metric (step S320). For example, the radio resource may be allocated to a connection for which the scheduling metric has a maximum value.

The BS transmits data of the connection allocated with the radio resource to the RS. The RS transmits to the MS the data received from the BS.

According to FIG. 5, a downlink buffer state from the RS to the MS and a channel state between the RS and the MS cannot be considered when scheduling is performed for downlink data transmission of the BS. For example, the BS cannot know a buffer state of the RS when a large amount of data is stored for a specific connection not only in a buffer of the BS but also in a buffer of the RS. Thus, without considering the buffer state of the RS, the BS allocates a radio resource for the specific connection by considering only the buffer state of the BS. Accordingly, a QoS cannot be improved from an overall system perspective, and radio resources cannot be effectively allocated. Thus, there is a need for a scheduling method whereby downlink data can be effectively transmitted in the wireless communication system using the RS.

Figure 6:
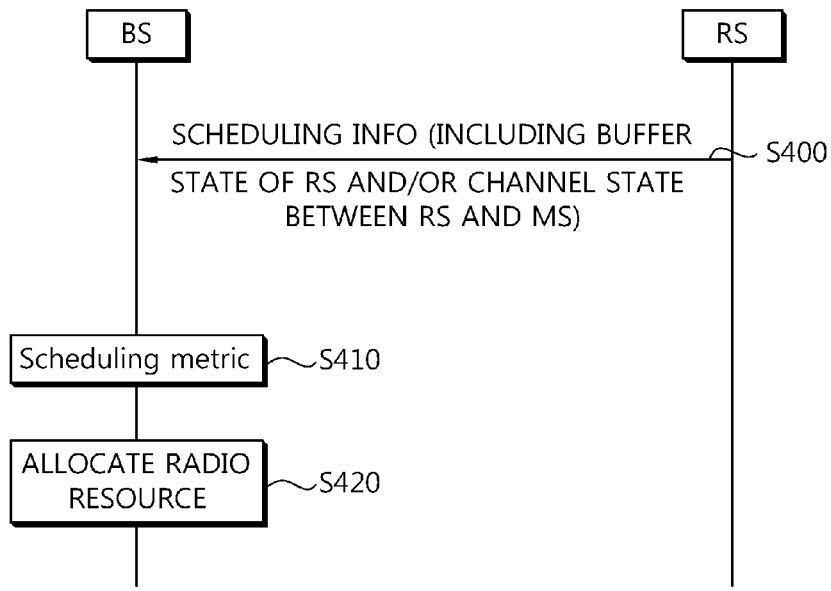
FIG. 6 is a flow diagram showing a scheduling method of a BS according to an embodiment of the present invention.

FIG. 6 is a flow diagram showing a scheduling method of a BS according to an embodiment of the present invention. Although a scheduling method for downlink data transmission is described as an example, the present invention is not limited thereto. Thus, those skilled in the art can easily apply the embodiment of the present invention to a scheduling method for uplink data transmission.

Referring to FIG. 6, an RS transmits scheduling information to the BS (step S400). The RS may transmit the scheduling information to the BS periodically or aperiodically. Herein, the scheduling information is information required in scheduling by which the BS performs downlink transmission to the RS. The scheduling information may include not only a communication state between the BS and the RS but also a communication state between the RS and an MS. The communication state may be indicated by a buffer state and/or a channel state. Hereinafter, scheduling information transmitted by the RS to the BS will be described in detail.

First, the RS can transmit a buffer state of the RS to the BS. The buffer state of the RS is a buffer state for each MS or each connection in the RS, and implies a buffer state for a downlink packet which is received from the BS and then transmitted to the MS.

Next, the RS may transmit a channel state between the RS and the MS to the BS. The channel state between the RS and the MS may be a channel state reported by the MS to the RS so that the RS can perform scheduling on the MS. The RS may transmit to the BS on a real time basis the channel state received from the MS. Further, the RS may transmit to the BS an average value of channel states received several times from the MS. In addition, the RS may measure a channel state between the RS and the BS and transmit the measured channel state to the BS.

Next, the RS may transmit a buffer depletion time for each MS or each connection in the RS to the BS. The buffer depletion time for each MS or each connection in the RS is a factor that considers both the buffer state of the RS and the channel state between the RS and the MS. The buffer depletion time can be estimated on the basis of an amount of data which is input to or output from the buffer for each MS or each connection in the RS. In addition thereto, the RS may transmit a buffer decrement rate for each MS or each connection in the RS to the BS.

The RS may transmit to the BS the buffer depletion time or the buffer decrement rate by indicating it with an "urgency level" having at least one bit format. The "urgency level" may imply a degree of urgency of scheduling for downlink transmission for each MS or each connection. If the buffer depletion time is short or the buffer decrement rate is high, the "urgency level" is high. If the buffer depletion time is long or the buffer decrement rate is low, the "urgency level" is low. For example, if the "urgency level" for each buffer is expressed with one bit, the bit may be a data request flag for a corresponding buffer. If the "urgency level" for each buffer is expressed with two bits, a degree of urgency for data to be added to a corresponding buffer can be expressed in an order of "11", "10", "01", and "00". The "urgency level" for each buffer may be expressed with three or more bits.

In step S400, the RS may transmit to the BS only information for scheduling on activated MSs. The activated MS is an MS which is activated at a current time among all MS performing communication via to the RS and which persistently receives downlink data. Accordingly, an overhead between the RS and the BS can be reduced. In this case, information required to create and update a set of activated MSs can be exchanged and shared between the RS and the BS.

Upon receiving the scheduling information from the RS, the BS performs scheduling by considering the scheduling information (step S410). The BS can calculate a scheduling metric for each MS or each connection. In this case, the scheduling metric is obtained by quantifying feasibility of radio resource allocation for each MS or each connection. Hereinafter, a method of calculating a scheduling metric based on a type of scheduling information received by the BS from the RS will be described in detail.

First, if the scheduling information received from the RS is the buffer state for each MS or each connection in the RS, the BS determines a scheduling metric based on the number of packets stored in a buffer of the RS. For example, if a small number of packets are stored in the buffer of the RS, the BS can determine the scheduling metric of a specific MS (or connection) to be high. Accordingly, radio resources can be effectively used.

Next, if the scheduling information received from the RS is the channel state between the RS and the MS, the BS determines the scheduling metric based on the channel state. For example, if the channel state between the RS and the MS is good, the BS can determine the scheduling metric of a specific MS (or connection) to be high. Accordingly, efficiency of downlink transmission from the RS to the specific MS (or connection) can be increased.

Next, if scheduling information received from the RS is the buffer depletion time or the buffer decrement rate for each MS or each connection in the RS, the BS determines the scheduling metric based on the buffer depletion time or the buffer decrement rate. That is, if the buffer depletion time is short or the buffer decrement rate is high, the BS can determine the scheduling metric of a specific MS (or connection) to be high. In addition, if the BS receives information regarding the buffer depletion time or the buffer decrement rate in a format of a bit-stream of "urgency level", the BS can determine the scheduling metric for a MS (or connection) having a high "urgency level". For example, if the "urgency level" is received in a one-bit format, the scheduling metric of the MS (or connection) may be determined to be higher than a current value upon receiving "1", and may be determined to be lower upon receiving "0". For another example, if the BS receives the "urgency level" in a two-bit format, the BS can determine the scheduling metric of the MS (or connection) to be high in an order of "11", "10", "01", and "00". Such a method can also be used when the "urgency level" is received in a three (or higher)-bit format.

The BS allocates a radio resource on the basis of the scheduling of step S410 (step S420). For example, the radio resource may be allocated to a MS (or connection) for which the scheduling metric has a maximum value. For downlink transmission on each RS, the BS allocates a radio resource of a specific time or frequency domain. In addition, with respect to the radio resource allocated for each RS, the BS determines a specific region of the radio resource to be occupied for each MS or each connection. If downlink data is transmitted to the same RS on a plurality of connections, the BS may assign identical or different modulation and coding schemes (MCSs) to the plurality of connections.

As such, when the BS performs scheduling by considering the buffer state of the RS and/or the channel state between the RS and the MS, radio resources can be more effectively used. In particular, even if a small number of data packets are stored in a buffer for a specific MS or a specific connection in the RS or if the buffer decrement rate is high, the BS performs scheduling by promptly considering such a situation, and performs downlink transmission with respect to the specific MS (or connection). Therefore, an underflow from the RS to the MS can be avoided.

The RS transmits scheduling information to the BS, and the BS performs scheduling by using the scheduling information. In this case, the RS transmits the scheduling information to the BS periodically or aperiodically. Hereinafter, a case where the RS aperiodically transmits the scheduling information to the BS will be described in detail.

First, the BS may request the RS to transmit the scheduling information, and in response thereto, the RS may transmit the scheduling information to the BS. Herein the scheduling information may include the content described in FIG. 6.

Next, the RS may transmit the scheduling information to the BS when a specific condition occurs. For example, if a buffer state of a specific MS or a specific connection in the RS is below or above a specific value, the RS may transmit the buffer state to the BS. For another example, if the channel state between the RS and the MS is changed to be above a specific level, the RS may transmit the channel state to the BS. For another example, if a buffer depletion time or a buffer decrement rate of a specific MS (or connection) is below or above a specific level, the RS may transmit the buffer depletion time or the buffer decrement rate to the BS.

Figure 7:
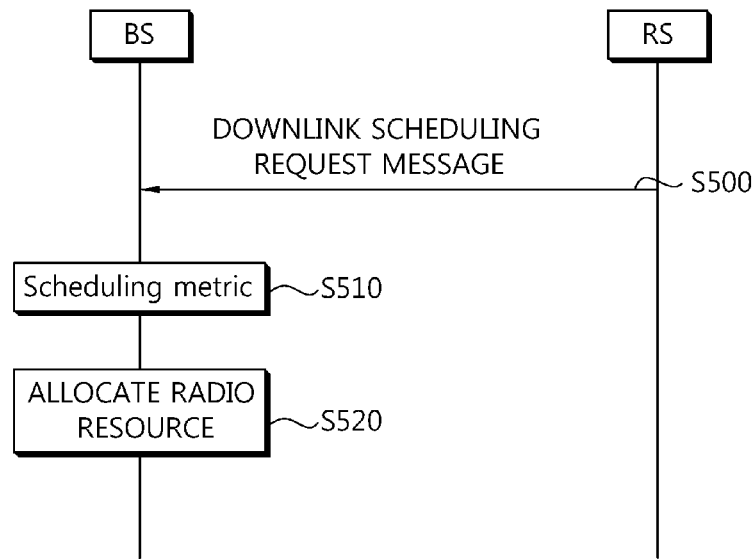
FIG. 7 is a flow diagram showing a scheduling method according to another embodiment of the present invention.

FIG. 7 is a flow diagram showing a scheduling method according to another embodiment of the present invention.

Referring to FIG. 7, an RS transmits a scheduling request message to a BS (step S500). The scheduling request message is a message for requesting scheduling for downlink transmission from the BS to an MS. If data for a specific MS (or connection) needs to be received urgently, the RS may transmit the scheduling request message to the BS. For example, if a buffer state of a specific MS or a specific connection in the RS is above or below a specific value, if a channel state between the RS and the MS is changed to be above a specific level, and if a buffer depletion time or a buffer decrement rate of the specific MS (or connection) is above or below a specific level, the RS may transmit the scheduling request message to the BS. The scheduling request message includes scheduling information. The scheduling information may be the scheduling information of FIG. 6.

Upon receiving the scheduling request message, the BS performs scheduling (Step S510). The BS may calculate a scheduling metric for each MS or each connection by considering the scheduling information included in the scheduling request message. For example, for a MS (or connection) requiring urgent data reception, the scheduling metric can be determined to be high. In addition, for the MS (or connection) requiring urgent data reception, a weight factor may be added to a previous scheduling metric of the MS.

The BS allocates a radio resource based on a result of the scheduling (step S520). The BS may allocate the radio resource to a MS (or connection) having a highest scheduling metric. Accordingly, radio resources can be effectively allocated.

Hereinafter, a method of transmitting downlink data by using radio resources scheduled by the aforementioned scheduling method will be described. If a specific radio resource is allocated to an MS connected to an RS, a data packet may be created for each MS or each connection and may be transmitted individually by using the allocated radio resource. For example, if 3 subcarriers are allocated to MSs 1 and 2 connected to the same RS, a data packet 1 for the MS 1 may be created and transmitted on first and second subcarriers, and a data packet 2 for the MS 2 may be created and transmitted on a third subcarrier. In this case, a modulation and coding scheme (MCS) may be determined for each MS or each connection. When a different MCS is determined for each MS or each connection, control information for each data packet is required, and an overhead occurs in control information transmission.

Figure 8:
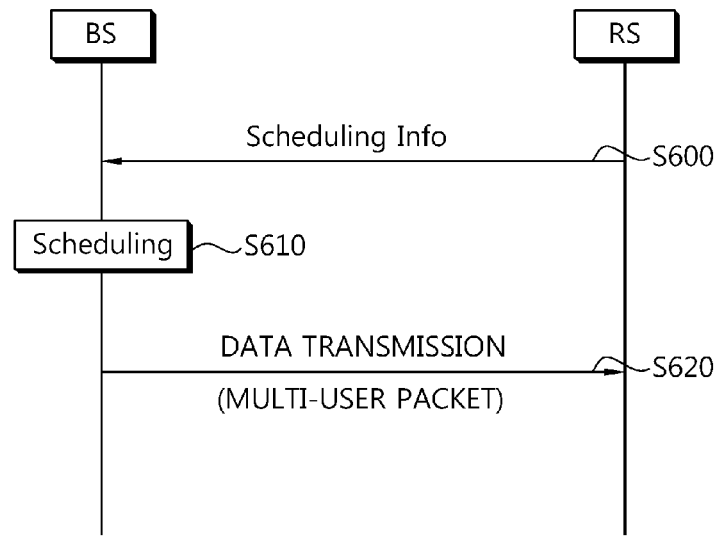
FIG. 8 is a flow diagram showing a downlink data transmission method according to an embodiment of the present invention.

FIG. 8 is a flow diagram showing a downlink data transmission method according to an embodiment of the present invention.

Referring to FIG. 8, an RS transmits scheduling information to a BS (step S600).

Upon receiving the scheduling information from the RS, the BS performs scheduling by considering the scheduling information (step S610), and transmits downlink data by using the scheduled radio resource (step S620). In this case, for MSs connected to the same RS, the downlink data may be transmitted by creating multi-user packets. That is, the multi-user packet may be transmitted using radio resources by collecting the radio resources for the MSs connected to the same RS and by creating the multi-user packets by extracting a specific amount of downlink data for MSs (or connections) allocated to the radio resources. For example, if 3 subcarriers are allocated to MSs 1 and 2 connected to the same RS, downlink data for the MS 1 and downlink data for the MS 2 may be transmitted on the 3 subcarriers by creating a multi-user packet for the downlink data. Within the multi-user packet, a payload occupied by the MS 1 may be different from a payload occupied by the MS 2. That is, an amount of extracted downlink data may be different so that a multi-user packet is created in proportion to a scheduling metric or an amount of a radio resource allocated for each MS. In this case, a common MCS is determined for a plurality of MSs (or connections) using one multi-user packet. Accordingly, an overhead of control information transmission can be reduced.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A scheduling method in a wireless communication system using a relay station, the method comprising:
   receiving scheduling information from the relay station; and
   performing scheduling by using the scheduling information,
   wherein a scheduling metric is determined for each connection between the relay station and a mobile station when the scheduling is performed, and
   wherein the scheduling information comprises: a downlink buffer size for each connection between the relay station and the mobile station, a channel state for each connection between the relay station and the mobile station, a downlink buffer depletion time for each connection between the relay station and the mobile station, a downlink buffer decrement rate for each connection between the relay station and the mobile station, and an urgency level indicating a degree of urgency of scheduling for downlink transmission for each connection between the relay station and the mobile station.

2. The scheduling method of claim 1, wherein the scheduling metric is determined to be higher for a connection of which the buffer size is small.

3. The scheduling method of claim 1, wherein the scheduling metric is determined to be higher for a connection of which the channel state is good.

4. The scheduling method of claim 1, wherein the scheduling metric is determined to be higher for a connection of which the buffer depletion time is short.

5. The scheduling method of claim 1, wherein the scheduling metric is determined to be higher for a connection of which buffer decrement rate is high.

6. The scheduling method of claim 1, wherein the scheduling metric is determined to be higher for a connection of which the urgency level is high.

7. A scheduling information transmission method of a relay station in a wireless communication system, the method comprising:
   configuring scheduling information for a downlink transmission; and
   transmitting the scheduling information to a base station,
   wherein the scheduling information comprises a communication state between the relay station and a mobile station,
   wherein the communication state is indicated by an urgency level expressed in a bit-stream format to indicate a degree of urgency of scheduling for the downlink transmission for each connection between the relay station and the mobile station, and
   wherein:
      the urgency level is expressed with one bit,
      if the one bit is "1", then the downlink transmission is more frequently performed, and
      if the one bit is "0", then the downlink transmission is less frequently performed.

8. The scheduling information transmission method of claim 7, wherein the urgency level is determined based on a downlink buffer depletion time or buffer decrement rate for each connection between the relay station and the mobile station.

9. The scheduling information transmission method of claim 7, wherein the scheduling information is transmitted if at least one of a downlink buffer size of a specific mobile station or a specific connection in the relay station, a channel state between the relay station and the mobile station, a downlink buffer depletion time of the specific mobile station or the specific connection in the relay station, and a downlink buffer decrement rate of the specific mobile station or the specific connection in the relay station is not within a certain range.

10. The scheduling information transmission method of claim 7, wherein the scheduling information is transmitted by the relay station to request a base station to perform downlink scheduling.

11. The scheduling information transmission method of claim 7, wherein the scheduling information is related to an activated mobile station that persistently receives downlink data.

* * * * *